(12) United States Patent
Elison et al.

(10) Patent No.: US 10,439,182 B2
(45) Date of Patent: Oct. 8, 2019

(54) CONNECTOR BARREL FOR A BATTERY MODULE

(71) Applicant: CPS Technology Holdings LLC, New York, NY (US)

(72) Inventors: Nicholas E. Elison, Milwaukee, WI (US); Richard M. DeKeuster, Racine, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 16/353,529

(22) Filed: Mar. 14, 2019

(65) Prior Publication Data

US 2019/0214617 A1     Jul. 11, 2019

Related U.S. Application Data

(63) Continuation-in-part of application No. 14/850,728, filed on Sep. 10, 2015, now Pat. No. 10,249,916.

(60) Provisional application No. 62/146,853, filed on Apr. 13, 2015.

(51) Int. Cl.

| | |
|---|---|
| *H01M 10/48* | (2006.01) |
| *B60L 11/18* | (2006.01) |
| *H01M 2/20* | (2006.01) |
| *H01M 2/10* | (2006.01) |
| *B60L 50/64* | (2019.01) |
| *H01M 10/42* | (2006.01) |
| *H01R 13/74* | (2006.01) |
| *H01R 31/06* | (2006.01) |

(52) U.S. Cl.
CPC .......... *H01M 2/1077* (2013.01); *B60L 50/64* (2019.02); *H01M 2/20* (2013.01); *H01M 10/425* (2013.01); *H01M 10/482* (2013.01); *H01R 13/743* (2013.01); *H01R 31/065* (2013.01); *H01M 2010/4278* (2013.01); *H01M 2220/20* (2013.01)

(58) Field of Classification Search
CPC ......................... H01M 10/48; H01M 10/0525
See application file for complete search history.

(56) References Cited

U.S. PATENT DOCUMENTS

| | | | | |
|---|---|---|---|---|
| 6,376,122 | B1 * | 4/2002 | Cheeseman ......... | H01M 2/0202 429/100 |
| D475,014 | S * | 5/2003 | Kano ........................... | D13/133 |
| D588,990 | S * | 3/2009 | Kok ............................. | D13/133 |
| D589,444 | S * | 3/2009 | Kok ............................. | D13/133 |
| D765,030 | S * | 8/2016 | Tyler ........................... | D13/119 |

(Continued)

*Primary Examiner* — Abdullah A Riyami
*Assistant Examiner* — Nader J Alhawamdeh
(74) *Attorney, Agent, or Firm* — Boardman & Clark LLP

(57) ABSTRACT

The present disclosure is directed to a battery module having an outer housing configured to receive a plurality of electrochemical cells, in which the outer housing has a wall including an inner surface facing a cavity formed by the outer housing, an outer surface opposite to the inner surface, and an opening extending through the wall. The battery module also includes a connector barrel configured to be disposed in the opening of the wall, in which the connector barrel has a first open end, a second open end, and a body forming a hollow interior between the first open end and the second open end, in which the connector barrel has a flange disposed on the body and extending outwardly from the body, and in which the flange has a plurality of ridges configured to abut the wall.

22 Claims, 12 Drawing Sheets

(56) References Cited

U.S. PATENT DOCUMENTS

| | | | |
|---|---|---|---|
| D803,778 S * | 11/2017 | Tononishi | D13/103 |
| 2001/0018294 A1 * | 8/2001 | Kameyama | H01R 31/06 439/654 |
| 2012/0308869 A1 * | 12/2012 | Obasih | H01M 2/0217 429/120 |
| 2014/0045026 A1 * | 2/2014 | Fritz | H01M 2/1077 429/99 |
| 2014/0062493 A1 * | 3/2014 | Farrell | B60L 50/50 324/426 |
| 2015/0217707 A1 * | 8/2015 | Tanigaki | B60K 1/04 180/65.1 |
| 2016/0197384 A1 * | 7/2016 | DeKeuster | H01M 2/305 429/120 |

* cited by examiner

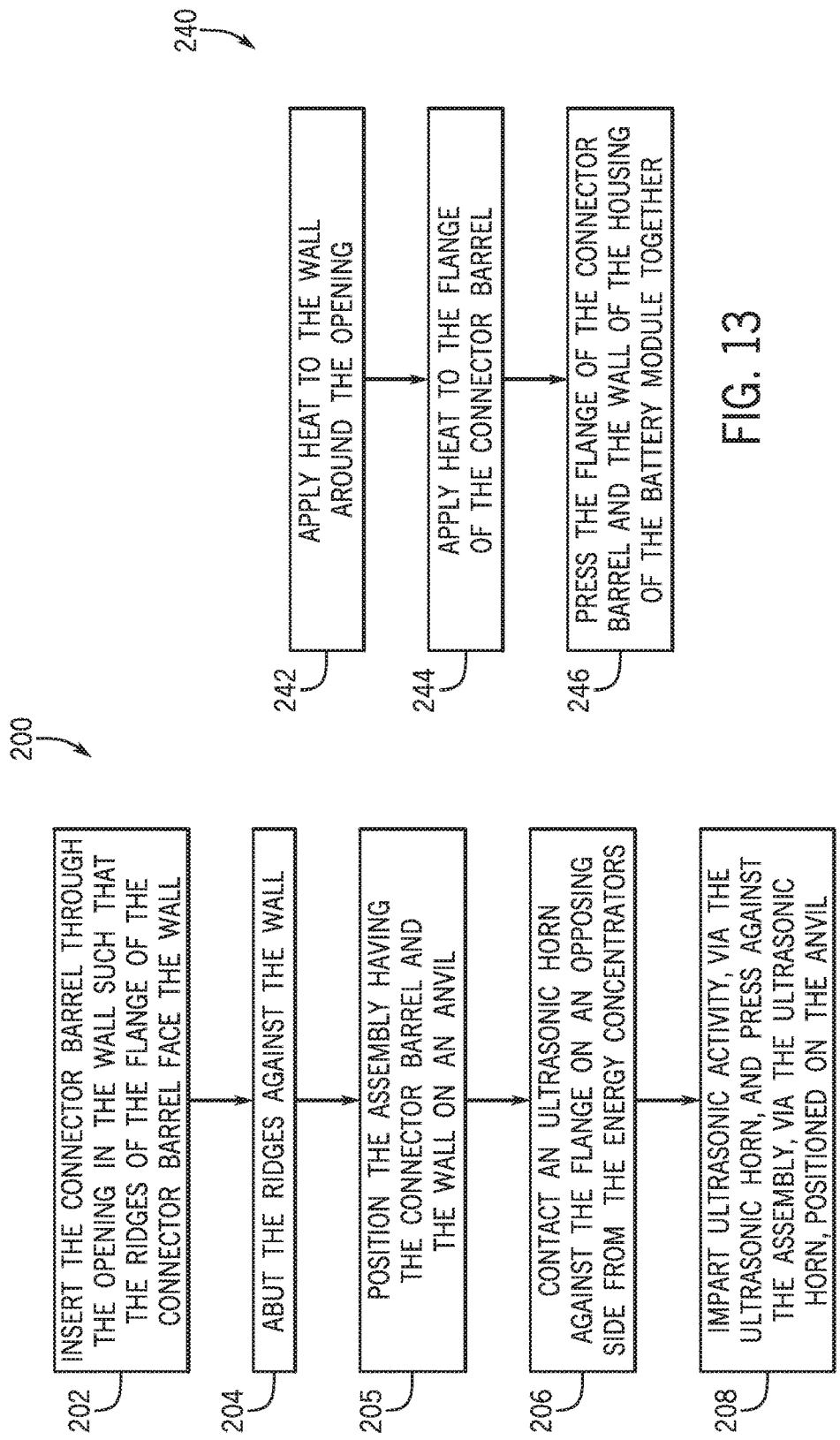

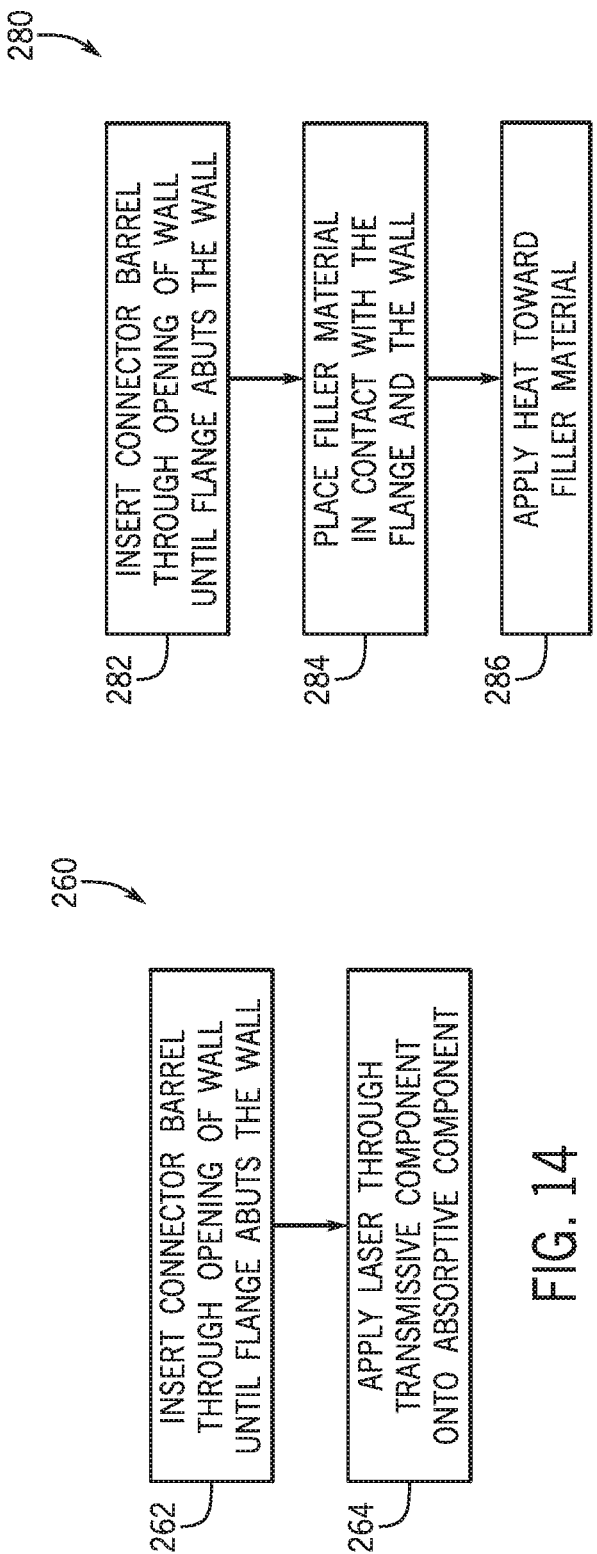

CONNECTOR BARREL FOR A BATTERY MODULE

CROSS REFERENCE TO RELATED APPLICATIONS

This application is a continuation-in-part of U.S. patent application Ser. No. 14/850,728, entitled "CONNECTOR BARREL FOR A BATTERY MODULE," filed Sep. 10, 2015, which claims priority to and the benefit of U.S. Provisional Application No. 62/146,853, entitled "LOW VOLTAGE SIGNAL CONNECTOR BARREL INSERT MOLDING FOR SEALING," filed Apr. 13, 2015, each of which is hereby incorporated by reference in its entirety for all purposes.

BACKGROUND

The present disclosure relates generally to the field of batteries and battery modules. More specifically, the present disclosure relates to a connector barrel disposed within a housing of a battery module and configured to guide electrical circuitry of the battery module and/or external processing devices.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include complicated and cumbersome architecture for supporting electrical circuitry enabling communication between the battery module and external devices. It is now recognized that improved structures and techniques for supporting electrical wiring and circuitry of a battery module are desired.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure is directed to a battery module having an outer housing configured to receive a plurality of electrochemical cells, in which the outer housing has a wall including an inner surface facing a cavity formed by the outer housing, an outer surface opposite to the inner surface, and an opening extending through the wall. The battery module also includes a connector barrel configured to be disposed in the opening of the wall, in which the connector barrel has a first open end, a second open end, and a body forming a hollow interior between the first open end and the second open end, in which the connector barrel has a flange disposed on the body and extending outwardly from the body, and in which the flange has a plurality of ridges configured to abut the wall.

The present disclosure is also directed to a method of manufacturing a battery module that includes positioning a body of a connector barrel through an opening in a wall of a housing of the battery module such that a first end of the connector barrel is disposed within an interior of the housing, such that a second end of the connector barrel is disposed outside the interior of the housing, and such that a first surface of a flange of the connector barrel, which extends outwardly from the body of the connector barrel, abuts the wall. The method further includes applying heat to cause local melting along an interface between the first surface of the flange and the wall, and cooling the interface such that the interface has a weld between the wall and the flange.

The present disclosure is further directed to a connector barrel of a battery module having a body and a flange disposed on the body and extending outwardly from the body. The body includes a first open end, a second open end, and a hollow interior formed by the body that extends between the first open end and the second open end. The flange includes a plurality of energy concentrator ridges disposed on a surface of the flange, in which the plurality of energy concentrator ridges are configured to facilitate ultrasonic welding of the flange to a wall of the battery module.

BRIEF DESCRIPTION OF THE DRAWINGS

Various aspects of this disclosure may be better understood upon reading the following detailed description and upon reference to the drawings in which:

FIG. 12 is a block diagram illustrating an embodiment of a method of coupling a connector barrel to a housing of a battery module, in accordance with an aspect of the present disclosure;

FIG. 13 is a block diagram illustrating an embodiment of a method of coupling a connector barrel to a housing of a battery module, in accordance with an aspect of the present disclosure;

FIG. 14 is a block diagram illustrating an embodiment of a method of coupling a connector barrel to a housing of a battery module, in accordance with an aspect of the present disclosure; and FIG. 15 is a block diagram illustrating an embodiment of a method of coupling a connector barrel to a housing of a battery module, in accordance with an aspect of the present disclosure.

DETAILED DESCRIPTION

Figure 1:
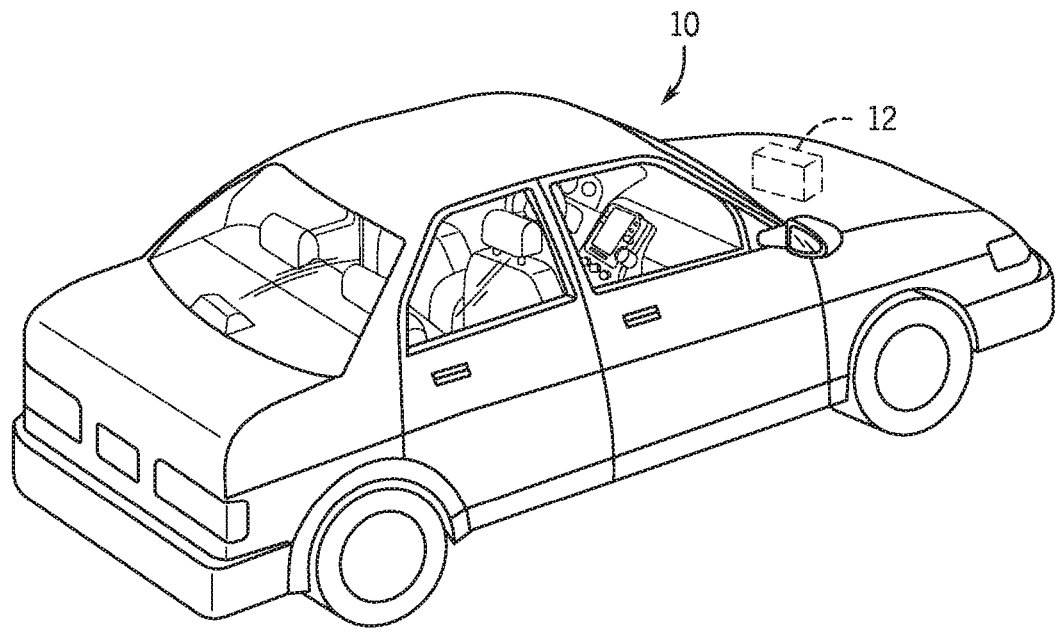
FIG. 1 is a perspective view of a vehicle having a battery system configured to provide power for various components of the vehicle, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing having a connector barrel disposed therein and/or coupled thereto. For example, the connector barrel may interface with (e.g., extend through) a housing wall of the battery module, and may include a hollow passage therethrough. The hollow passage of the connector barrel is configured to receive electrical circuitry, such that electrical components internal to the battery module can connect with devices external to the battery module. In some embodiments, the hollow passage may receive an internal electrical connector from inside the housing of the battery module and an external connector from outside the housing of the battery module, where the internal and external connectors are coupled within the hollow passage.

For example, the connector barrel may guide and/or route one or more electrical signal connectors, such as a low voltage signal connector and a vehicle control module connector that, when coupled, connect the battery module to a vehicle control module. Specifically, the low voltage signal connector and the vehicle control module connector may be inserted through opposing ends of the connector barrel to mate within the hollow passage of the connector barrel. As suggested above, the connectors may be utilized to connect the electronics and/or control circuits disposed within the housing of the battery module to a vehicle control module disposed external to the battery module. In certain embodiments, the connector barrel may guide and/or route other types of electrical circuitry, such as a high voltage connector (which may be used to connect the power output of the battery module to the vehicle power system) or a grounding stud (which may serve as a connection point to connect the battery module to the ground). Indeed, while the connector barrel may be utilized to guide and route a variety of different types of electrical circuitry disposed within the housing, embodiments of the present disclosure will be discussed with respect to the low voltage signal connector and the vehicle control module connector.

In certain embodiments, the connector barrel may be a hollow conduit having a body portion, which defines a hollow passage or hollow passages, and having two open ends disposed on opposite ends of the body portion. In certain embodiments, the low voltage signal connector may mate with a complementary vehicle control module connector within the connector barrel. Specifically, the connector barrel may be configured to house both the low voltage signal connector and the vehicle control module connector within the hollow conduit. For example, the low voltage signal connector may pass through the first open end of the hollow conduit, and the voltage signal connector may pass through the second open end of the hollow conduit. The low voltage signal connector may then mate (e.g., connect) with the vehicle control module connector within the hollow conduit. In this manner, the connector barrel may be utilized to connect the electronics and/or control circuits disposed within the housing of the battery module to a vehicle control module outside the battery module.

In certain embodiments, the connector barrel may be disposed through, or in, an opening within a wall of the housing. For example, the connector barrel may be coupled to the wall while the connector barrel is positioned within the opening. That is, the connector barrel may be configured such that the first open end of the connector barrel is disposed within the housing, the second open end of the connector barrel is disposed outside of the housing, and the body portion of the connector barrel is positioned within the opening in the wall of the housing. Accordingly, the low voltage signal connector may be received in the first open end within the housing, and the vehicle control module connector may be received in the second open end outside of the housing.

Continuing with the description above, the connector barrel may include a flange configured to abut the housing wall to enable intimate contact between the connector barrel and the housing wall. Indeed, the flange may be disposed on the connector barrel such that, when the flange abuts the housing wall, the first open end is on a first side of the wall and the second open end is on a second side of the wall. The flange and the wall may then be welded together to couple the connector barrel with the wall of the housing.

In certain embodiments, the connector barrel may be ultrasonically welded to the wall of the housing. In this manner, high-frequency, ultrasonic vibrations are applied to the flange and/or wall to oscillate the components. For example, the connector barrel and the housing well may be held together by a horn, which is connected to a transducer, and an anvil. The horn may apply, via the transducer, the ultrasonic activity to the connector barrel and the housing wall, causing a solid-state weld therebetween. For example, the ultrasonic oscillations produce friction between the components, which increases local temperatures and causes local melting. When the molten or partially molten material re-solidifies, a molecular bond may form between the housing wall and the flange of the connector barrel. In some embodiments, the weld may be improved by forming, prior to the ultrasonic activity, ridges along one or more of the surfaces being ultrasonically welded together. The ridges may concentrate energy to induce greater movement and greater friction when ultrasonic vibrations are transmitted. In this manner, the ridges may facilitate melting of the components to couple the flange and the wall of the housing together.

Additionally or alternatively, heat may be directly applied to couple the connector barrel and the wall of the housing together. For example, heat may be applied to an area of the connector barrel (e.g., an area of the flange) and/or an area of the wall to melt at least a portion of the respective areas. In one embodiment, a heated component may be disposed between the connector barrel and the housing wall, causing a surface of the connector barrel to melt and a surface of the housing wall to melt. The melted areas may then be placed in contact with one another to form a bond between the molten material as it solidifies. When the molten material re-solidifies, the connector barrel and the wall of the housing may be joined.

Additionally or alternatively, laser transmission may be used to provide heat to melt the connector barrel and/or the wall of the housing when the connector barrel is positioned against the wall. By way of example, one of the components (e.g., the connector barrel or the housing wall) may include a transmissive material to permit the laser to transmit through the component. The other component (e.g., the housing wall or the connector barrel) may include an absorptive material configured to absorb the laser and convert infrared radiation of the laser into heat to increase a temperature of the component. As a result, at least a portion of the component with the absorptive material may melt and heat may also be transferred to melt the component with transmissive material as well to produce the mixed molten material that re-solidifies to couple the connector barrel and the wall of the housing together. These and other features will be described in detail below with reference to the drawings.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
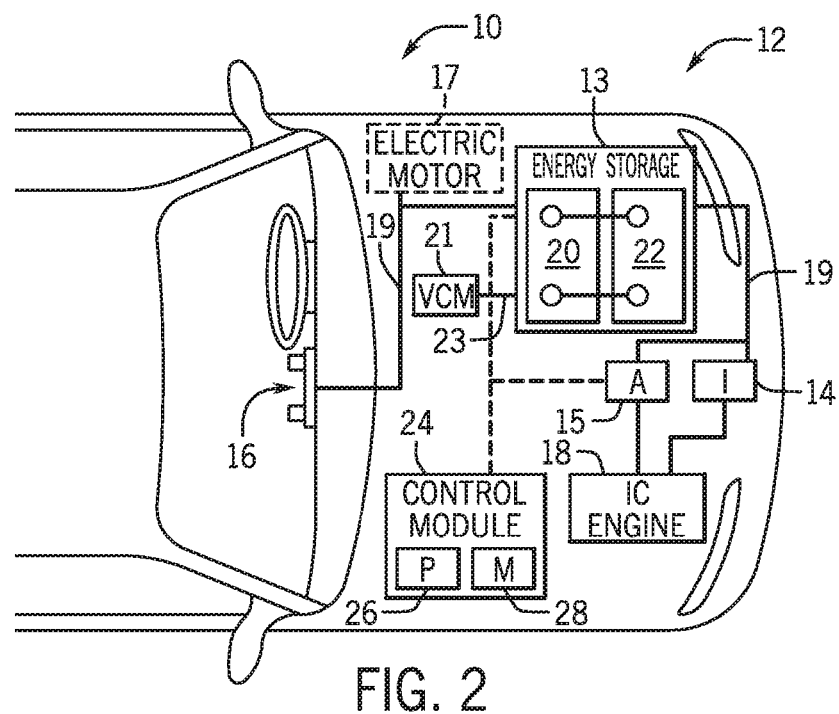
FIG. 2 is cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, a vehicle control module (VCM) 21, and optionally to an electric motor 17. Generally, the energy storage component 13 may capture/ store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like. While the control module 24 is illustrated external to the battery system 12, the control module 24 may be disposed within, for example, the lithium ion battery module 20.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Additionally, the vehicle 10 may include the VCM 21 that may control one or more operational parameters of the various components of the vehicle 10. In certain embodiments, the VCM 21 may include one or more processor 26 and one or more memory 28 programmed to perform such tasks. The battery modules 20, 22 may be coupled to the VCM 21 via one or more communication lines. For example, a vehicle control module line 23 may be utilized to couple the VCM 21 to the battery module 20, as further described in detail below. The VCM 21 may receive input from the battery modules 20, 22 (and more specifically, from the control module 24) regarding various parameters, such as a state of charge and temperature. The VCM 21 may be configured to utilize the received information to determine when to charge and/or discharge the battery module 20, when to discontinue charging the battery module 20, and so forth.

The illustrated battery module 20 (which is encompassed in the battery system 12 of FIG. 1) of FIG. 2 may include features configured to enable electrical communication between the control module 24 (e.g., of the battery module 20) and, for example, the vehicle control module 21 of the vehicle 10. In accordance with the present disclosure, the battery module 20 may include a connector barrel configured to support mating of a connector of the control module 24 of the battery module 20 and a connector of the vehicle control module 21 of the vehicle 10. These and other feature will be described in detail below with reference to later figures.

Figure 3:
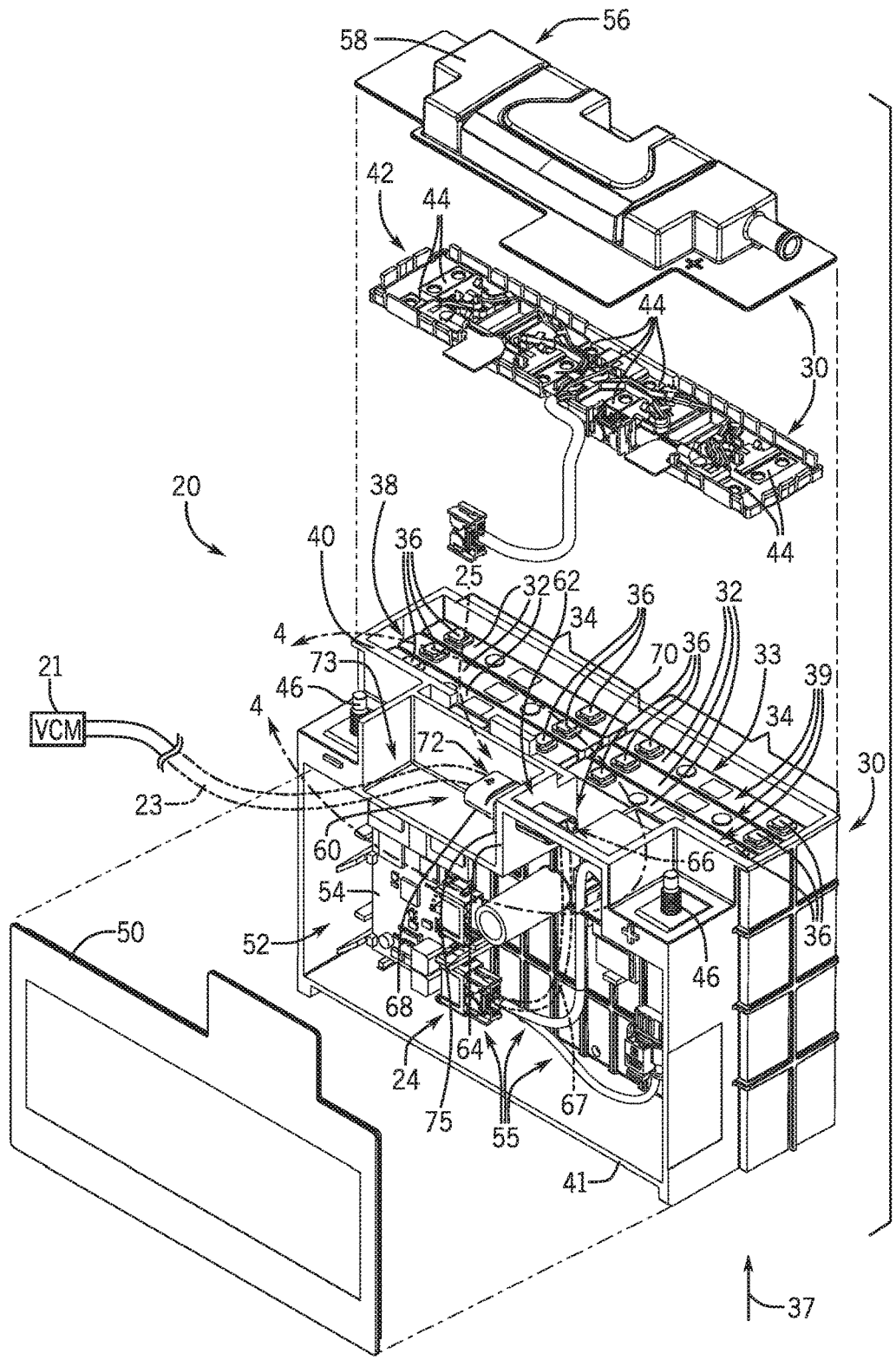
FIG. 3 is a perspective view of an embodiment of a battery module for use in the vehicle of FIG. 2, in accordance with an aspect of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium ion [Li-ion] battery module) includes a housing 30 and electrochemical cells 32 disposed inside the housing 30. For example, the electrochemical cells 32 are received through a cell receptacle region 33 of the housing 30 and into the inside of the housing 30. In the illustrated embodiment, six prismatic lithium-ion (Li-ion) electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 extending upwardly (e.g., in direction 37) from terminal ends 39 of the electrochemical cells 32. Accordingly, the terminals 36 may extend outwardly from the cell receptacle region 33 toward an upper side 40 (e.g., upper end or face opposite a base 41) of the housing 30. For example, the electrochemical cells 32 may be inserted into the housing 30 through the cell receptacle region 33 in the upper side 40, and positioned within the housing 30 such that the terminals 36 of the electrochemical cells 32 are disposed in the cell receptacle region 33. A bus bar carrier 42 may be disposed into the cell receptacle region 33 and may retain bus bars 44 disposed thereon, where the bus bars 44 are configured to interface with the terminals 36 of the electrochemical cells 32. For example, the bus bars 44 may interface with the terminals 36 to electrically couple the electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load.

In the illustrated embodiment, the housing 30 of the battery module 20 includes one or more covers configured to seal the housing 30. For example, the cell receptacle region cover 56 may be disposed over the upper side 40 of the housing 30 (and over the bus bar carrier 42) to seal the upper side 40 of the housing 30. In certain embodiments, the bus bar carrier 42 may be coupled to the housing 30 to fix the bus bar carrier 42 within the cell receptacle region 33 and over the electrochemical cells 32. As a further example, the housing 30 may include an electronics compartment cover 50 that fits over an electronics compartment 52 of the housing 30, where the electronics compartment 52 of the housing 30 retains, for example, a printed circuit board (PCB) 54 and other electrical components 55 (e.g., a relay, communications lines) of the battery module 20. In certain embodiments, the electronics compartment cover 50 and/or the cell receptacle region cover 56 may be welded (e.g., laser welded) to the body of the housing 30.

In accordance with embodiments of the present disclosure, a connector barrel 60 (e.g., comprising electrically insulative material, such as nylon or plastic) may be disposed through an opening 62 within a wall 64 of the housing 30. The opening 62 may be a passageway between the interior of the housing 30 and the exterior of the housing 30. Specifically, the connector barrel 60 may be configured to receive a low voltage signal connector 66 from the control module 24 disposed within the interior of the electronics compartment 52 (e.g., within the housing 30). Likewise, the connector barrel 60 may be configured to receive a vehicle control module connector 25 (e.g., of the VCM 21). In certain embodiments, the low voltage signal connector 66 may be communicatively coupled to a low voltage signal line 67 (e.g., spanning between the low voltage signal connector 66 and the control module 24 of the battery 20), and the vehicle control module connector 25 may be communicatively coupled to the vehicle control module line 23 (e.g., spanning between the vehicle control module connector 25 and the VCM 21). In this manner, the low voltage signal line 67 and the vehicle control module line 23 may be communication lines that are configured to communicatively couple the control module 24 with the VCM 21, as described in detail below.

The low voltage signal connector 66 and the vehicle control module connector 25 may be configured to mate within the connector barrel 60. In such embodiments, the connectors 66, 25 may work with the low voltage signal line 67 and the vehicle control module line 23, respectively, to connect the control module 24 to the VCM 21. Specifically, the low voltage signal connector 66 and the vehicle control module connector 25 (working with the low voltage signal line 67 and the vehicle control module line 23) may be configured to provide information, related to conditions of the battery module 20, to the vehicle control module 21. For example, in certain embodiments, information related to a state of the charge of the battery module 20, the temperature of the battery module 20, one or more warnings related to the battery module 20, a status change of the battery module 20, or any other information related to the overall condition of the battery module 20 may be transmitted to the VCM 21.

In certain embodiments, the connector barrel 60 may be a hollow conduit having a body portion 68, a first open end 70, and a second open end 72 opposite the first open end 70. In particular, the first open end 70 may be disposed inside the housing 30, and may be configured to receive the low voltage signal connector 66 within the housing 30. Further, the second open end 72 may be disposed outside the housing 30, and may be configured to receive the vehicle control module connector 25 outside the housing 30. Specifically, the second open end 72 may be disposed within a recess 73 of housing 30, such that the connector barrel 60 may be inserted at the recess 73 into the opening 62. As noted above, the low voltage signal connector 66 and the vehicle control module connector 25 may mate within the hollow conduit (e.g., body portion 68) of the connector barrel 60. In this manner, the connector barrel 60 may house the low voltage signal connector 66 from inside the housing 30 of the battery module 20 and the vehicle control module connector 25 from outside of the battery module 20. Accordingly, the opening 62 disposed within the wall 64 of the housing 30 may be configured to secure the connector barrel 60, and to allow the passage of the low voltage signal connector 66 and the vehicle control module connector 25 through the connector barrel 60, as described in further detail below.

It should be noted that the opening 62 disposed within the wall 64 may be configured to receive the connector barrel 60. For example, the opening 62 may be sized to securely receive an external perimeter of the body of the connector barrel 60. In other words, the connector barrel 60 may have a perimeter sized to match the opening 62.

In certain embodiments, the connector barrel 60 may be welded or otherwise coupled to the wall 64 of the housing 30 to fix the connector barrel 60 within the opening 62. For example, the connector barrel 60 may be placed through the opening 62 of the housing 30. In particular, in certain embodiments, an operator may insert the connector barrel 60 into the housing 30 in a desired orientation. In certain embodiments, due to manufacturing imperfections (e.g., tolerances) and other factors, dimensions of the opening 62 within the housing and dimensions of the connector barrel 60 may only partially correspond with one another. In such situations, one or more features disposed on an exterior surface of the body portion 68 of the connector barrel 60 may help secure the connector barrel 60 to the wall 64 of the housing 30, as further described in detail with respect to FIG. 4. In accordance with the present disclosure, such features may include features that facilitate welding (e.g., ultrasonic or laser welding).

Figure 4:
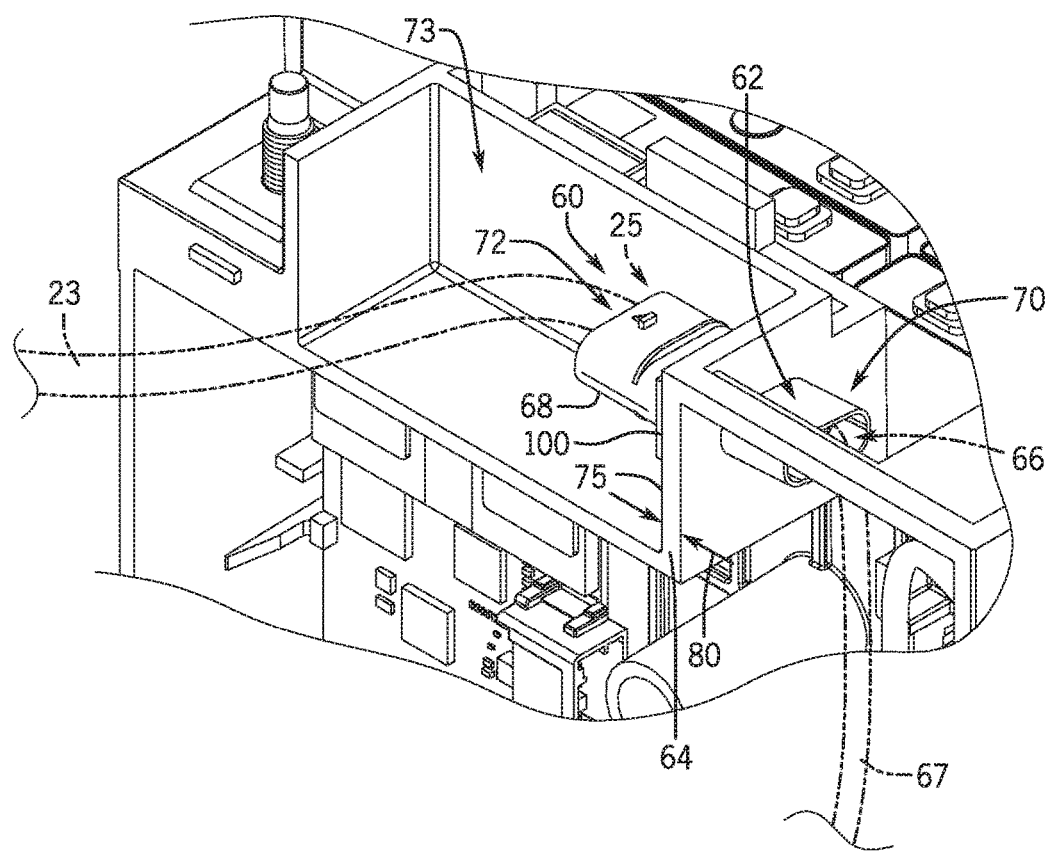
FIG. 4 is a detailed view of a portion of the battery module of FIG. 3, taken along lines 4-4 of FIG. 3, illustrating a connector barrel for use in the battery module of FIG. 3, in accordance with an aspect of the present disclosure.

FIG. 4 is a detailed view of the battery module 20 of FIG. 3, taken along lines 4-4, illustrating the connector barrel 60 in accordance with an aspect of the present disclosure. As shown, the first open end 70 may be disposed inside the housing 30 and may be configured to receive the low voltage signal connector 66 within the housing 30. Further, the second open end 72 may be disposed within a recess 73 of housing 30, and may be configured to receive the vehicle control module connector 25 within the recess 73 outside of the housing 30. A flange 100, which is partially blocked from view in the illustrated embodiment by the wall 64, of the connector barrel 60 may be disposed on and surround the body portion 68 such that, when the connector barrel 60 is inserted through the opening 62 in the wall 64, the flange 100 is configured to contact an outer surface 75 of the wall 64. The flange 100 and the outer surface 75 of the wall 64 may then be welded together, such as via applied ultrasonic vibrations or heat, to couple the connector barrel 60 and the wall 64. The re-solidified mixture coupling the flange 100 and the wall 64 may also seal an area surrounding the opening 62 and, thus, block unwanted particles (e.g., air, debris) from flowing through the opening 62 of the wall 64. As shown, the wall 64 may include a thickness 80 spanning a length of the connector barrel 60. In certain embodiments, the thickness 80 of the wall 64 may also be configured to support the weight of the connector barrel 60 and any signal connectors passing through the connector barrel 60.

Figure 5:
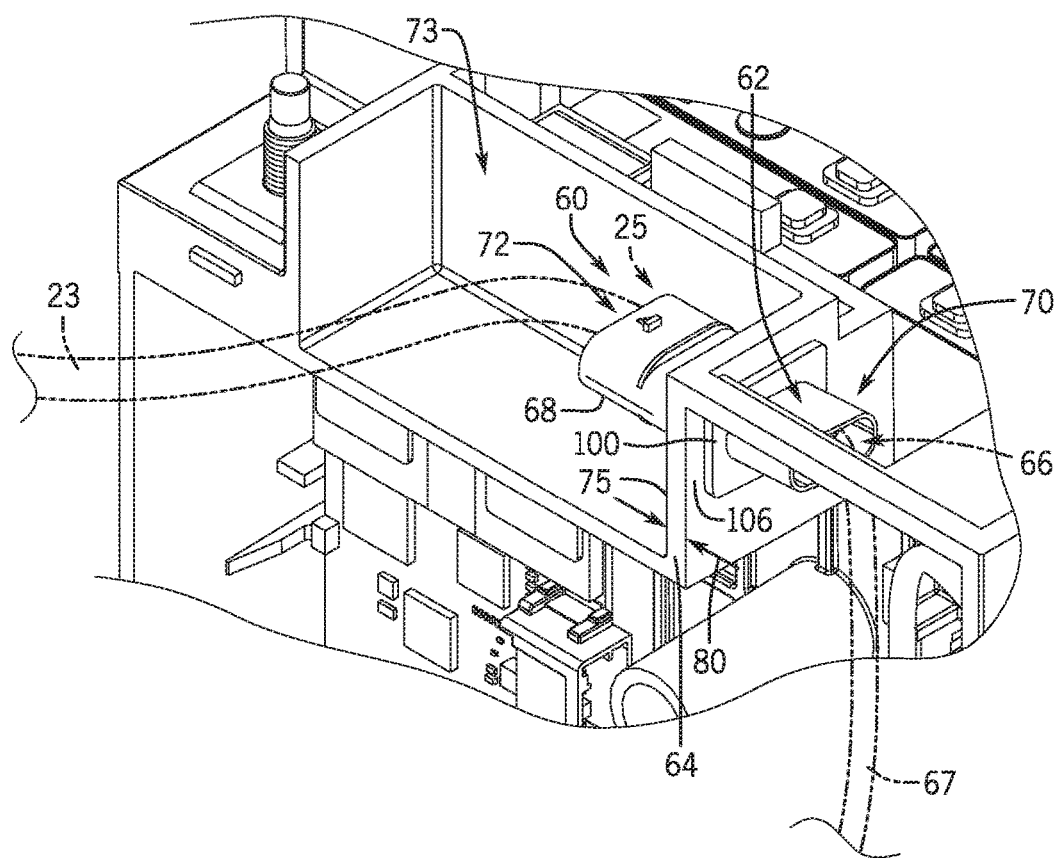
FIG. 5 is a detailed view of an embodiment of a portion of the battery module of FIG. 3, taken along lines 4-4 of FIG. 3, illustrating a connector barrel for use in the battery module of FIG. 3, in accordance with an aspect of the present disclosure.

FIG. 5 is a detailed view of an embodiment of the battery module 20 of FIG. 3, taken along lines 4-4 of FIG. 3, illustrating a different placement of the connector barrel 60 than illustrated in FIG. 4. In the illustrated embodiment, the connector barrel 60 is inserted through the opening 62 in the wall 64 such that the flange 100 contacts an inner surface 106 of the wall 64 that is positioned opposite the outer surface 75 of the wall 64. As such, ultrasonic vibrations or heat may be applied to couple the flange 100 with the inner surface 106 of the wall 64, thereby coupling the connector barrel 60 and the wall 64. In such embodiments, the first open end 70 may still be disposed inside the housing 30 and receive the low voltage signal connector 66 within the housing 30, and the second open end 72 may still be disposed within the recess 73 of the housing 30, and may be configured to receive the vehicle control module connector 25 within the recess 73 outside of the housing 30. In such embodiments, the packaging of the battery module 20 may be improved by limiting a hardware footprint of the connector barrel 60 outside of the housing 30. In other words, an amount of the connector barrel 60 extending outside of the housing 30 may be reduced by disposing the flange 100 of the connector barrel 60 inside the housing 30 and against the inner surface 106 of the wall 64 of the housing 30.

Figure 6:
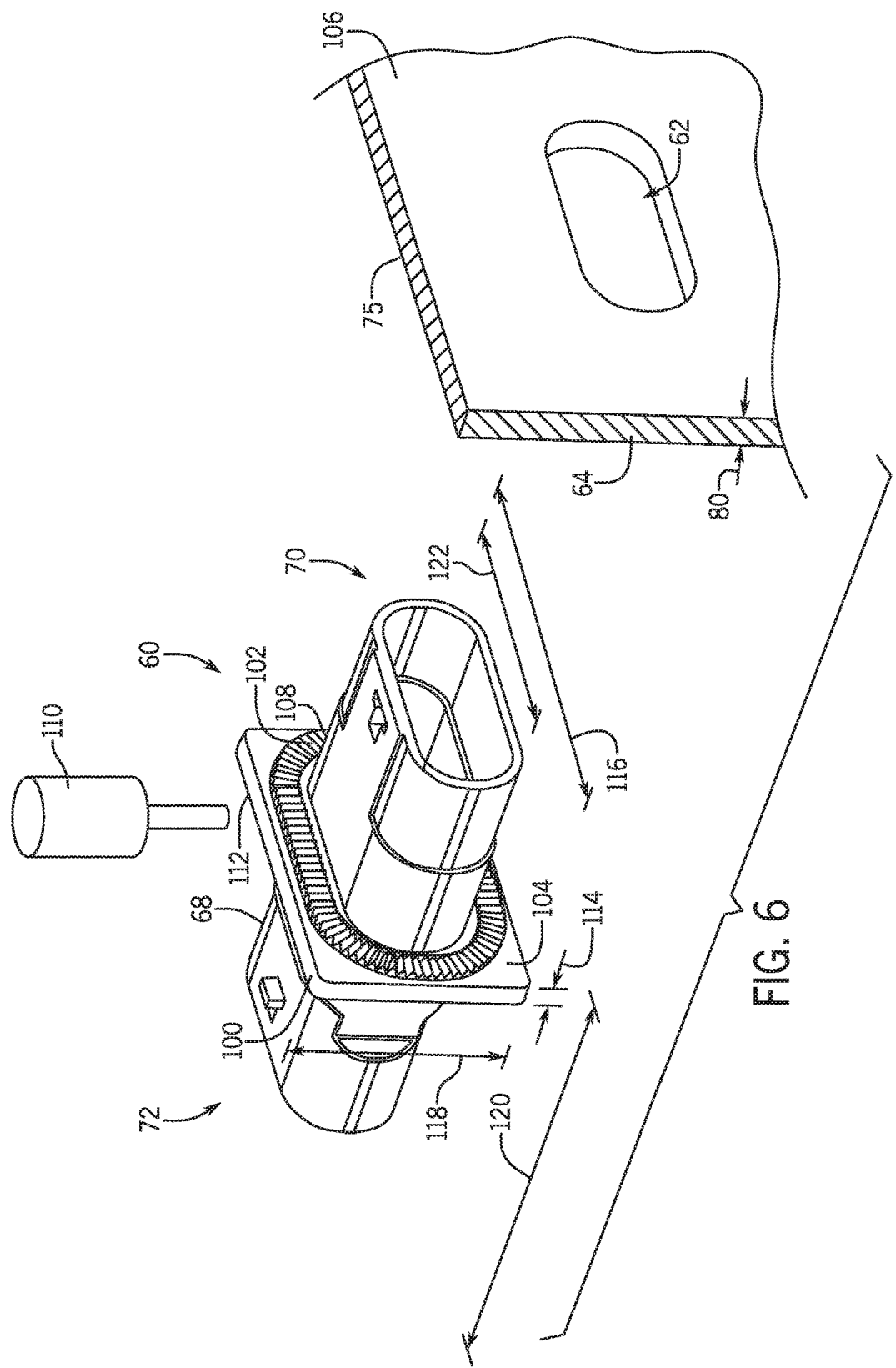
FIG. 6 is an exploded perspective view of an embodiment of the connector barrel and housing wall for use in the battery module of FIG. 3, in accordance with an aspect of the present disclosure.

FIG. 6 is an exploded perspective view of an embodiment of the connector barrel 60 for use in the battery module 20 of FIG. 3. In the illustrated embodiment, the connector barrel 60 includes, as previously described, the first open end 70, the second open end 72, and the body portion 68 extending between the first and second open ends 70, 72. The connector barrel 60 also includes the flange 100 disposed along the body portion 68, such as approximately midway between the first open end 70 and the second open end 72, although other positions of the flange 100 along the connector barrel 60 may be possible. The flange 100 may include ridges 102, which may be referred to as "energy concentrators," disposed on a first surface 104 of the flange 100. As illustrated in FIG. 6, the ridges 102 may extend from the first surface 104 with a triangularly shaped profile along the length 120 of the connector barrel 60 and toward the open end 70 of the connector barrel 60. As shown, the ridges 102 on the flange 100 may be orthogonal to an outer surface of the body portion 68 of the connector barrel 60. In some embodiments, the wall 64 of the battery module may include a single ridge, which is configured to extend orthogonal to the ridges 102 of the flange 100. That is, the wall 64 may include a single ridge that extends around the opening 62 in the wall 64, such that the single ridge on the wall 64 generally follows a curvature of the body portion 68 of the connector barrel 60 once the connector barrel 60 is disposed in the opening 62, as described below.

The connector barrel 60 may be inserted through the opening 62 of the wall 64 such that the ridges 102, or "energy concentrators," contact the outer surface 75 of the wall 64. In some embodiments, as previously described, the outer surface 75 of the wall 64 may include a ridge, which extends along the opening 62 and is configured to be orthogonal to the ridges 102 on the flange 100 of the connector barrel 60. When the connector barrel 60 is inserted through the opening 62, the first open end 70 may traverse the thickness 80 such that it is disposed adjacent to the inner surface 106 of the wall 64, and such that the flange 100 of the connector barrel 60 contacts the wall 64 of the battery module. For example, when the connector barrel 60 is fully inserted into the opening 62, tips 108 of the ridges 102 may be in contact, or close proximity, with the outer surface 75 (e.g., ridge of the outer surface 75).

To couple the connector barrel 60 with the wall 64, ultrasonic vibrations may be directed at the flange 100 and/or the wall 64. As an example, the wall 64 (and corresponding battery module) may be positioned on, or partially within, an anvil configured to hold the assembly. The connector barrel 60 may then be inserted into the opening 62 such that the first surface 104 of the flange 100 contacts the outer surface 75 of the wall 64, as previously described. An ultrasonic welding horn 110, or "sonotrode" connected to a transducer, is configured to transmit ultrasonic vibrations and may be placed in contact with a second surface 112 (e.g., outer surface) of the flange 100 opposite to the first surface 104 of the flange 100. As ultrasonic vibrations are transmitted, the horn 110 may also press into the assembly. The transmitted ultrasonic vibrations may oscillate the flange 100 such that the oscillations propagate through a flange thickness 114 to vibrate the ridges 102. Vibration of the ridges 102 against the outer surface 75, in conjunction with the pressing force of the horn 110, may enhance a solid-state weld therebetween. For example, the ridges 102 may act as energy concentrators, which enhance local melting by directing the ultrasonic vibrations to a particular region or regions of the surfaces to be mated.

For example, the tips 108 of the ridges 102 concentrate the vibrational energy to enable a targeted seal. That is, the tips 108 of the ridges 102 in the illustrated embodiment may be specifically designed to receive and direct the ultrasonic vibrations applied to the flange 100 via the horn 110, thereby improving an efficiency of the ultrasonic vibrations and corresponding horn 110 with respect to local melting. It should be noted that, in certain embodiments, the ridges 102 may be formed on the second surface 112, and the connector barrel 60 may be inserted through the opening 62 such that the ridges 102 on the second surface 112 abut the inner surface 106 of the wall 64. Ultrasonically welding the connector barrel 60 to the wall 64 may then be performed by contacting the horn 110 to the first surface 104. The dimensions of the flange 100 (e.g., the flange thickness 114, a width 116, a height 118) may be designed to accommodate the ridges 102 and to effectively ultrasonically weld the wall 64 and the connector barrel 60 together. That is, the flange thickness 114 and/or the thickness 80 of the wall 64 may be configured such that the ultrasonic vibrations may effectively propagate through to oscillate the ridges 102. As previously described, a length 120 of the connector barrel 60 may be selected such that the connector barrel 60 is suitable for facilitating the mating of electrical components described in detail above with reference to earlier drawings.

Figure 7:
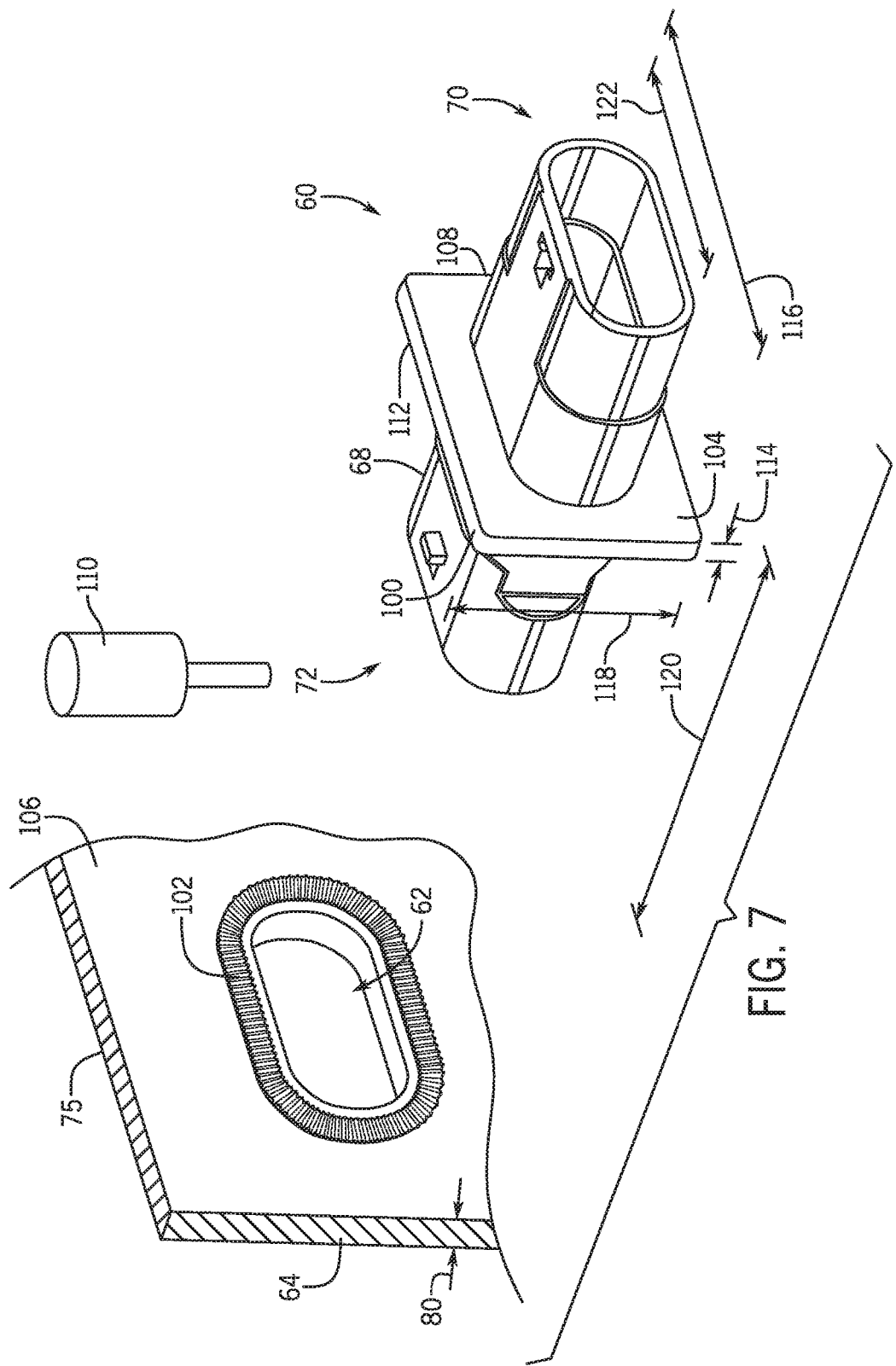
FIG. 7 is an exploded perspective view of an embodiment of the connector barrel and housing wall for use in the battery module of FIG. 3, in accordance with an aspect of the present disclosure.

FIG. 7 is an exploded perspective view of an embodiment of the connector barrel 60 for use in the battery module 20 of FIG. 3. In the illustrated embodiment, the wall 64 may include the ridges 102 disposed around the opening 62, and the flange 100 may not include the ridges 102. When the connector barrel 60 is inserted through the opening 62, the tips of the ridges 102 may abut the second surface 112 of the flange 100. The horn 110 may apply ultrasonic vibrations (e.g., transmitted through the wall 64 and/or through the flange 100) to create friction that melts the local regions adjacent to the ridges 102. The ridges 102 may improve a magnitude and/or accuracy of the generated friction, thereby improving the local melting. Upon cooling, the melted regions may solidify to couple the second surface 112 with the inner surface 106. In additional or alternative embodiments, the ridges 102 may be disposed around the opening at the outer surface 75 of the wall 64 to enable the first surface 104 of the flange 100 to couple to the outer surface 75 of the wall 64.

Figure 8:
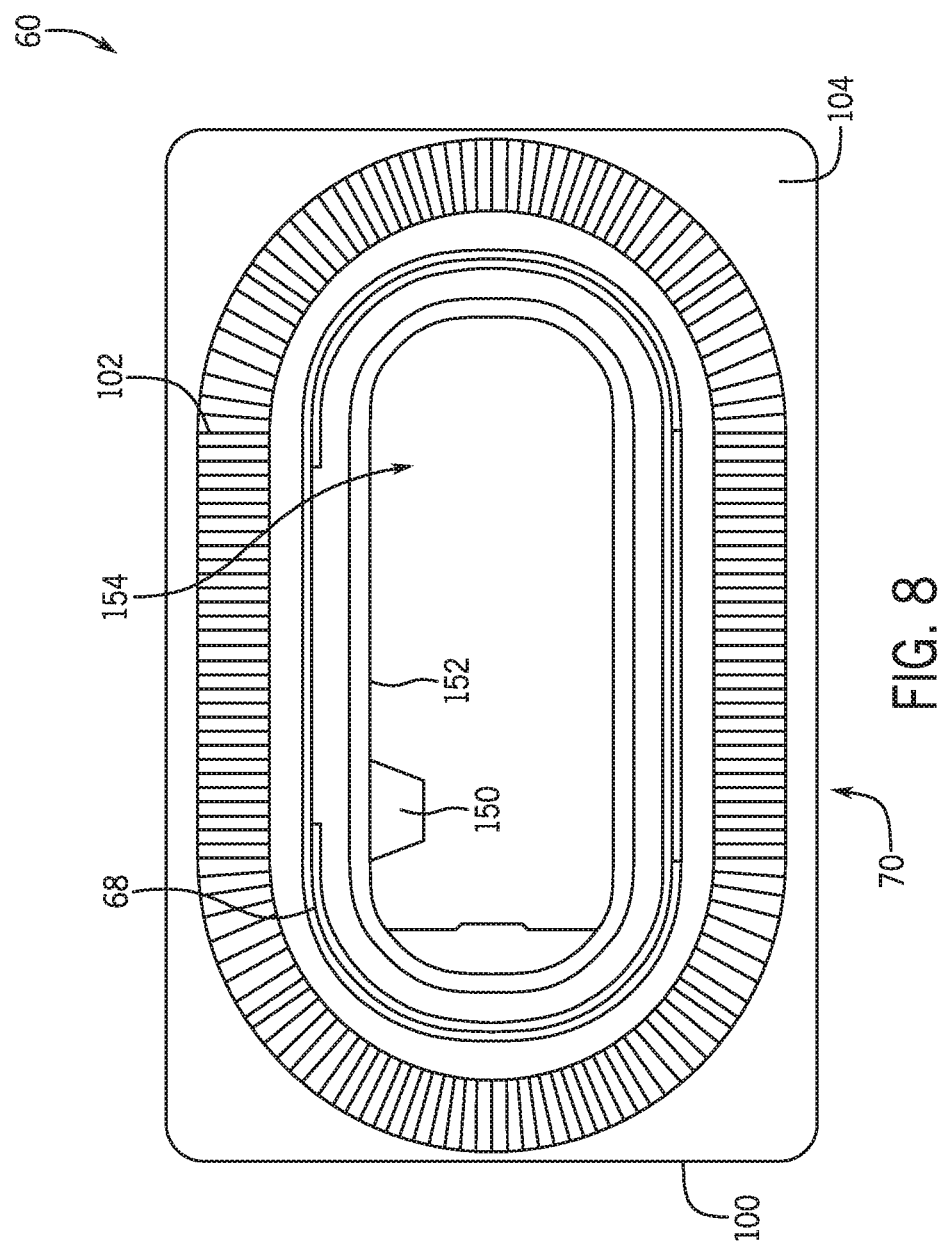
FIG. 8 is a front view of an embodiment of the connector barrel for use in the battery module of FIG. 3, in accordance with an aspect of the present disclosure.

FIG. 8 illustrates a front view of an embodiment of the connector barrel 60. As shown, the ridges 102 may be disposed on the first surface 104, and each ridge 102 extends generally orthogonal to a curvature of, or radially outwardly from, the body portion 68 of the connector barrel 60. Additionally, the ridges 102 are distributed evenly to surround a border of the body portion 68 of the connector barrel 60, in which the body portion 68 may have an elliptical shape or another suitable shape (e.g., rectangular, circular) extending along the length 120 of the connector barrel 60. For example, each ridge 102 may have approximately the same shape and the spaces between each ridge 102 may be approximately equal to one another. The even distribution of the ridges 102 may enable improved ultrasonic welding of the flange 100 onto the wall 64. For example, the even distribution of the ridges 102 may enable the ridges 102 to melt readily and in an even manner with the application of ultrasonic welding, thereby enabling the flange 100 to couple to the wall 64 in a level manner. However, it should be understood that the ridges 102 may also be aligned in other suitable formations on the first surface 104, such as in horizontal rows and vertical columns, and/or in a random formation to enable the flange 100 to couple to the wall 64 via ultrasonic welding in a different manner. In certain embodiments, the ridges 102 may be disposed in a section of the first surface 104, rather than fully surrounding the body portion 68. Although FIG. 8 depicts the flange 100 as having an approximately rectangular shape extending or protruding outwardly from the body portion 68, in additional or alternative embodiments, the flange 100 may be of another suitable shape, such as an elliptical, triangular, or another shape extending or protruding outwardly from the body portion 68.

In certain embodiments, the connector barrel 60 may include a notch 150 disposed within/on an internal surface 152 of the connector barrel 60. That is, the notch 150 may extend into a hollow interior 154 that extends between the first open end 70 and the second open end 72 of the body portion 68. Specifically, the notch 150 may be utilized to separate the hollow interior 154 into one or more sections, thereby providing one or more internal fastening elements or additional guide posts for the connector barrel 60. While the illustrated embodiment only depicts one notch 150, it should be noted that any number (e.g., 2, 3, 4, 5, 6, 7, 8 or more) of notches 150 may be disposed throughout the connector barrel 60 and may be configured as additional guides. In certain embodiments, the notches 150 may extend along the length 120 of the connector barrel 60, and may be configured as guide rails that guide the low voltage signal connector 66 and the vehicle control module connector 25 into the connector barrel 60 in an appropriate orientation.

Figure 9:
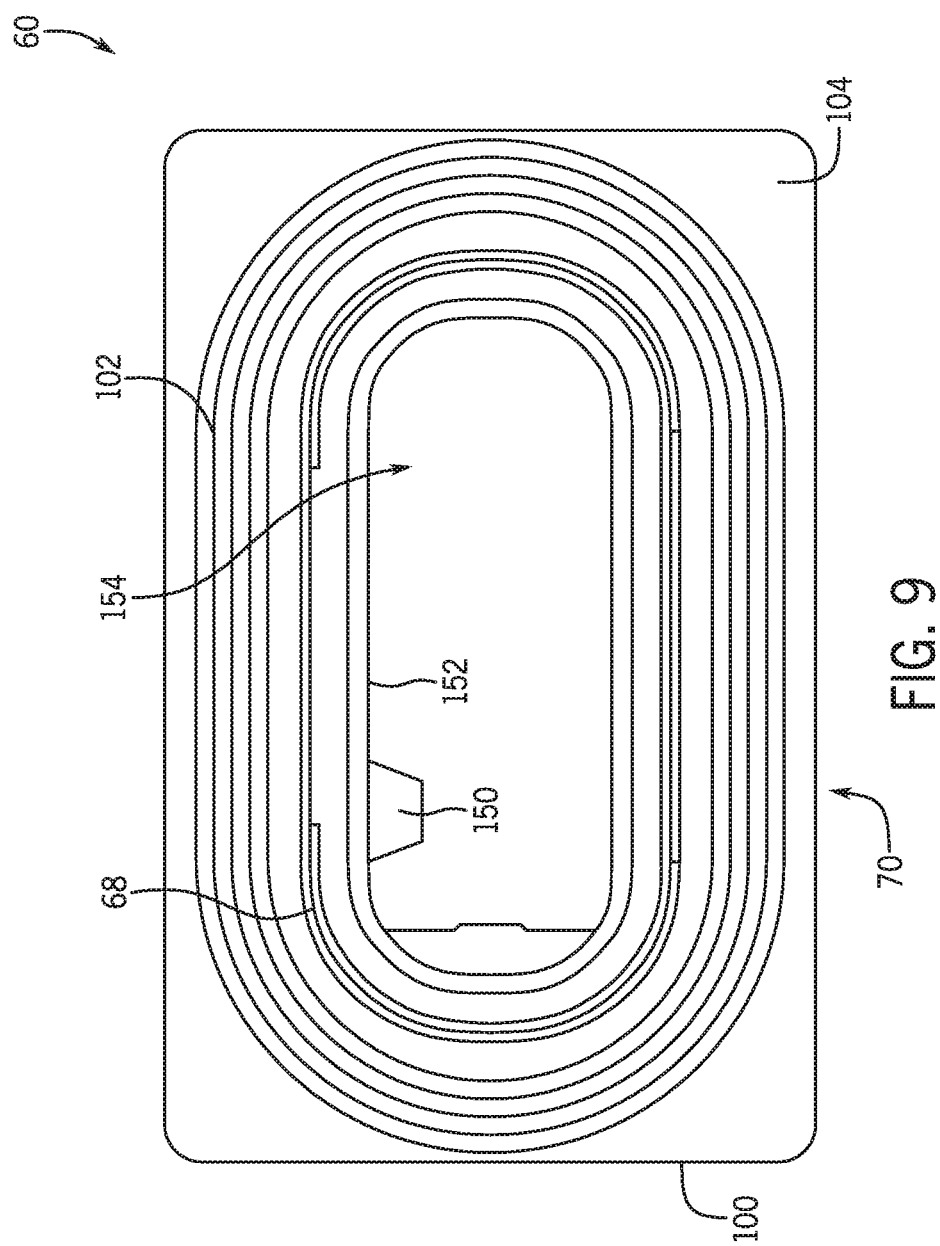
FIG. 9 is a front view of an embodiment of the connector barrel for use in the battery module of FIG. 3, in accordance with an aspect of the present disclosure.

FIG. 9 illustrates a front view of an embodiment of the connector barrel 60. In FIG. 9, the ridges 102 are disposed on the first surface 104 of the flange 100 elliptically or circumferentially around the body portion 68 of the connector barrel 60. That is, the ridges 102 generally follow the curvature of the body portion 68 around at least a portion of the perimeter of the body portion 68 to form a "ring" or "loop" around the body portion 68, or a portion of a ring or loop. In the illustrated embodiment, there are several "loops" that concentrically surround the body portion 68, but in additional or alternative embodiments, the ridges 102 may surround the body portion 68 in one or more "spiral" formations. In certain embodiments, the ridges 102 may form portions of a ring or loop (e.g., arcuate segments of a ring or loop), each portion being separated via a gap.

Figure 10:
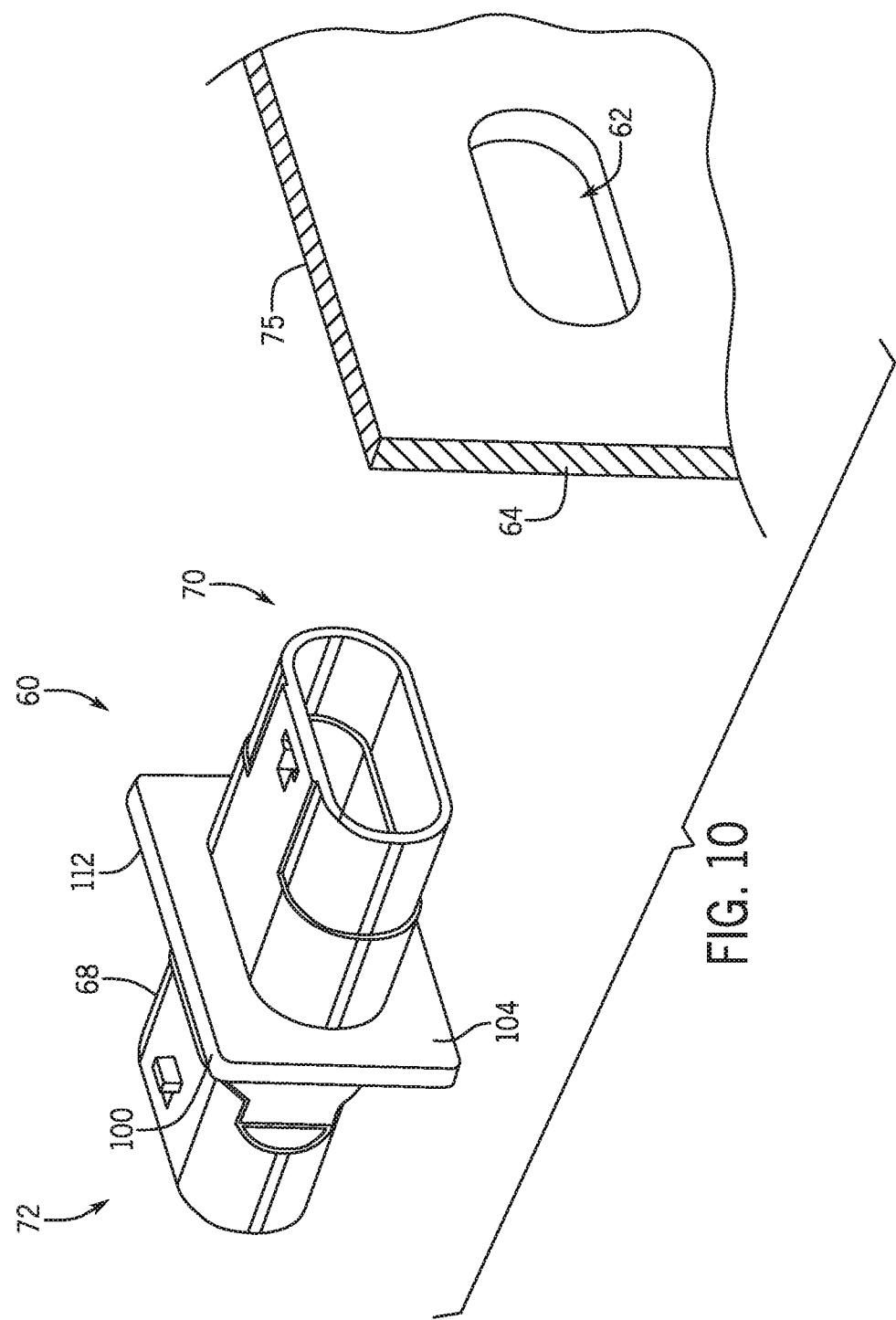
FIG. 10 is a perspective view of an embodiment of the connector barrel for use in the battery module of FIG. 3, in accordance with an aspect of the present disclosure.

A perspective view of an embodiment of the connector barrel 60 is illustrated in FIG. 10. As illustrated in FIG. 10, the flange 100 does not include the ridges or "energy concentrators." In some embodiments, coupling of the illustrated connector barrel 60 may utilize ultrasonic welding in accordance with the description above, but without the ridges or "energy concentrators."

In other embodiments, the illustrated connector barrel 60 may be configured to be coupled to the wall 64 via other methods of applied heat. As an example, the connector barrel 60 may be inserted through the opening 62 such that the flange 100 is adjacent to the wall 64. Heat may be applied between the flange 100 and the wall 64 to melt the flange 100 and/or the wall 64 and weld the connector barrel 60 to the wall 64.

Additionally or alternatively, heat may be applied via laser transmission. That is, either the flange 100 or the wall 64 may include absorptive material configured to convert the energy of the laser into heat to melt and weld the components together. The other of the flange 100 or the wall 64 may include a transmissive material which allows the energy to pass therethrough. For example, the flange 100 may include a transmissive material and the wall 64 may include an absorptive material. Laser energy may be applied through the flange 100 and to the wall 64. The wall 64 may absorb the laser energy at the outer surface 75 of the wall 64, thereby heating the outer surface 75 of the wall 64, which causes the outer surface 75 of the wall 64 the first surface 104 of the flange 100 to melt together.

Additionally or alternatively, heat may be applied to the flange 100 and the wall 64 separately, prior to abutment of the flange 100 with the wall 64. When the heat has substantially melted both the flange 100 and the wall 64, the surfaces may be mated. In some embodiments, the surfaces may be heated while the connector barrel 60 is partially disposed within the opening 62, and the flange 100 of the connector barrel 60 may then be pushed into the wall 64 to weld the components together.

Figure 11:
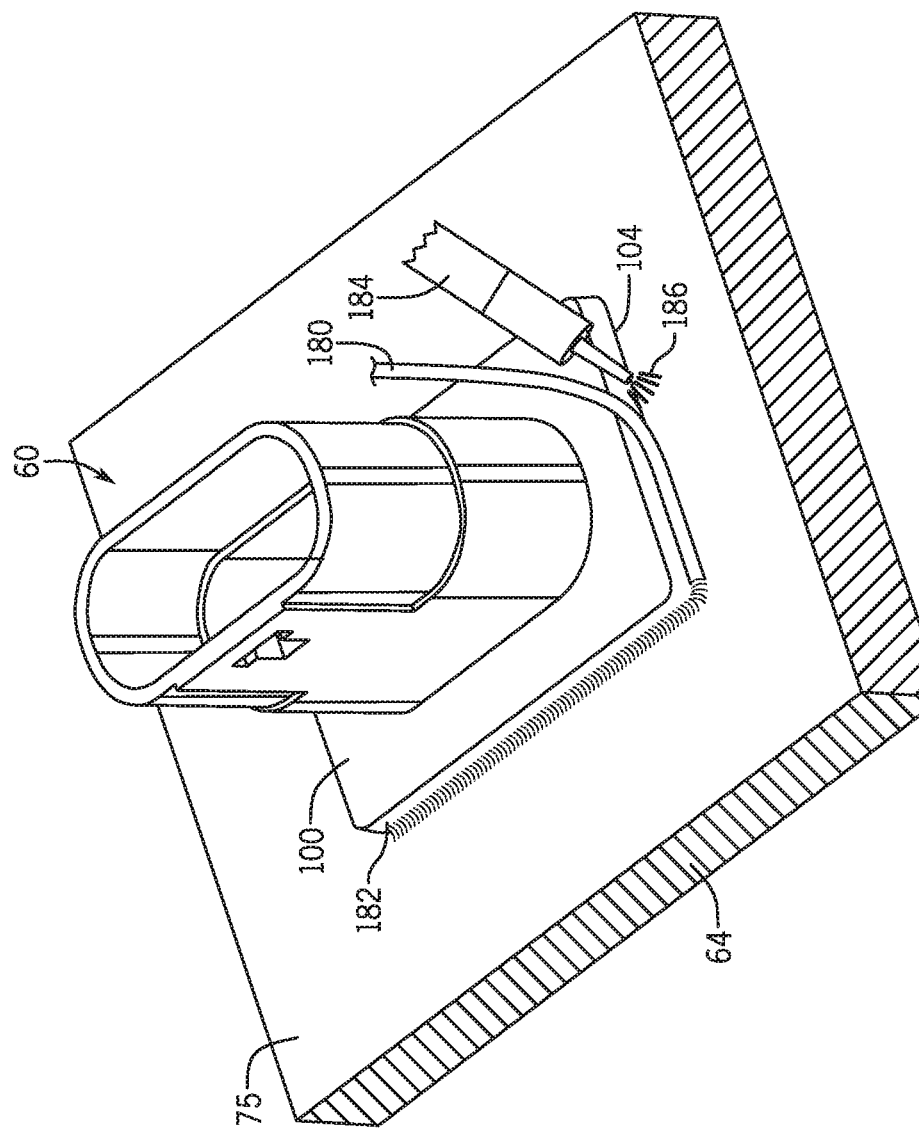
FIG. 11 is a perspective view of an embodiment of the connector barrel for use in the battery module of FIG. 3, in accordance with an aspect of the present disclosure.

FIG. 11 illustrates a perspective view of an embodiment of the connector barrel 60 that may be coupled to the wall 64. In the illustrated embodiment, the first surface 104 of the flange 100 of the connector barrel 60 is placed in contact with the outer surface 75 of the wall 64. Additionally, a filler material 180 (e.g., weld rod) may be positioned around the flange 100 and placed in contact with a border surface 182 of the flange 100 of the connector barrel 60 and the outer surface 75 of the wall 64. That is, the filler material 180 may be positioned at a corner formed by the border surface 182 abutting the outer surface 75. A torch 184 or other tool may be used to melt the filler material 180. For example, the torch 184 may emit heat 186 (e.g., via a hot gas) toward the filler material 180 to melt the filler material 180, the flange 100, and/or the wall 64. When the filler material 180 cools, the filler material 180 solidifies the wall 64 with the flange 100.

FIGS. 12-15 each illustrate a block diagram of a method to couple the connector barrel with the wall, in accordance with the present disclosure. It should be understood that the methods may not be exclusive and that steps that are not mentioned may be performed. Additionally, a step of one of the methods may be used in another method such that different methods may be at least partially combined with one another. It should also be understood that there may be additional methods that are not specifically described with respect to FIGS. 12-15, but may also be utilized to couple the connector barrel with the wall in accordance with the present disclosure.

FIG. 12 illustrates an embodiment of a method 200 for coupling the connector barrel and the wall of the housing via ultrasonic welding. For example, the connector barrel may be inserted (block 202) through an opening in the wall. As indicated by block 202, the connector barrel is inserted in a manner such that the surface of the flange that includes the ridges, or "energy concentrators," faces the wall.

Further, the connector barrel is maneuvered within the opening to abut (block 204) the ridges of the flange of the connector barrel against the wall. That is, the connector barrel may be inserted through the opening until a substantial number of ridge tips abuts the wall.

Further still, the method 200 includes positioning (block 205) the assembly having the connector barrel and the wall on an anvil. The anvil is essentially a substrate on which the assembly is positioned, and against which forces are exerted to couple the assembly. For example, the method 200 also includes contacting (block 206) an ultrasonic welding horn with the flange at the surface that does not include the ridges. The method 200 then includes transmitting (block 208) ultrasonic vibrations that propagate through the thickness of the flange of the connector barrel, through the ridges on the opposing side of the flange, and towards the wall. The anvil may provide support for the assembly as the ultrasonic welding horn is placed in contact with the flange to facilitate transmission of the ultrasonic vibrations. As previously described, the ultrasonic vibrations may cause local melting along an interface between the flange and the wall. The interface may then be cooled such that the partially molten mixture re-solidifies to couple the flange of the connector barrel with the wall via an ultrasonic weld.

It should be understood that a method similar to the method 200 may also be used if the ridges are disposed on the wall instead of the flange. Further, as previously described, the ridges may be on a different surface of the connector barrel, and the different surface of the connector barrel may be ultrasonically welded to a different (e.g., inner) surface of the wall. Further still, in some embodiments, ultrasonic welding may be utilized without including the ridges or "energy concentrators" on either of the wall or the flange.

FIG. 13 is a block diagram illustrating an embodiment of a method 240 for coupling the connector barrel and the wall by heating the connector barrel and the wall. In block 242, heat is applied to the wall around the opening. The heat may be applied via, for example, a hot plate, with electric current, with a hot fluid, or via another suitable method. The heat then melts a portion of the wall around the opening.

In block 244, heat is similarly applied to the flange and may be applied approximately simultaneously as the heat applied to the wall. Indeed, the heat source for the flange and the wall may be the same. For example, a hot plate may be disposed between the flange of the connector barrel and the wall of the housing of the battery module, and may apply heat to the surfaces intended to be mated. The heat may cause melting of the surfaces intended to be mated.

After heat has been applied to both the wall and the flange to melt the respective components, the flange of the connector barrel may be pressed (block 246) into the wall. In some embodiments, the connector barrel may be pre-positioned within the opening in the wall while the wall and the flange of the connector barrel are heated. In other embodiments, the flange of the connector barrel and the wall of the housing of the battery module are heated prior to insertion of the connector barrel through the opening in the wall. In either embodiment, the abutment of the melted components produce the molten mixture that may re-solidify to couple the connector barrel with the wall.

FIG. 14 illustrates a method 260 for coupling the connector barrel with the wall. In the method 260, one of the connector barrel or the wall includes a laser transmissive material, while the other component includes a laser absorptive material. As used herein, "transmissive" is used to describe materials that are configured permit to laser wavelengths around the infrared spectrum (e.g., between 808 nanometers [nm] and 980 nm) to pass through the material without affecting a structure of the material, and "absorptive" is used to describe materials that absorb laser wavelengths around the infrared spectrum to convert infrared radiation energy of the laser into heat. For example, the connector barrel may include a transmissive plastic-based material, while the wall may include an absorptive plastic-based material.

Continuing with the illustrated method 260, the connector barrel is inserted (block 262) through the opening until the flange abuts the wall. Pressure may be applied such that a surface of the flange is substantially flush with a surface of the wall to reduce a gap between the flange and the wall to facilitate coupling the flange and the wall.

In block 264, a laser (e.g., via a semiconductor diode laser) is applied through the component (e.g., of the flange of the connector barrel) that includes the transmissive material towards the component (e.g., the wall of the housing of the battery module) that includes the absorptive material. In this manner, the laser passes through the transmissive component (e.g., the flange of the connector barrel) and is absorbed by the absorptive component (e.g., the wall of the housing of the battery module). The absorptive material then converts infrared energy of the laser into heat, which melts at least a portion of either the transmissive component and/or the absorptive component to create the molten mixture. It should be understood that, although each component may include materials of different absorption levels, the materials may still include similar properties, such as melting points, to enable coupling of the connector barrel 60 and the wall 64. That is, as the wall absorbs the energy from the laser and is heated, the flange may receive the heat via conduction, thereby causing the components to melt and solidify together. For example, the connector barrel and the wall of the housing may each be made of the same type of material (e.g., polypropylene), but have different transmissive properties. Additionally, it should be noted that the wavelength of the laser may be based at least in part on the respective materials of the connector barrel and/or the wall, such as absorptive properties of the respective materials.

In some embodiments, the absorptive component may include at least one ridge to which the laser is directed. Thus, the laser may be absorbed by the ridge(s) to heat the ridge(s) and cause local melting to couple the flange to the wall at the ridge(s). As an example, the ridge(s) may have an oval, elliptical, rectangular shape, another suitable shape, or any combination thereof, and may follow at least a portion of a perimeter of the flange.

FIG. 15 illustrates a method 280 for coupling the connector barrel with the wall via hot gas welding. In the method 280, the connector barrel is inserted (block 282) through the opening in the wall of the housing of the battery module until the flange abuts the wall and is substantially flush with a surface of the wall. A filler material is positioned (block 284) such that the filler material is in contact with both the flange and the wall. For example, the filler material may be positioned in a corner formed by contacting the flange and the wall. In block 286, heat is applied toward the filler material, which may melt the filler material, the flange, and/or the wall. When the filler material solidifies, the filler material may bond with the flange and the wall. As such, the solidified filler material couples the flange with the wall.

In certain embodiments, the filler material may be automatically positioned. For example, a torch may be configured to apply heat and also to feed the filler material as heat is applied. As the filler material is fed, the applied heat may at least partially melt the filler material. In this manner, the torch may be directed to output the melted filler material such that the melted filler material is in contact with the flange and the wall, in which solidification of the melted filler material couples the flange and the wall together.

One or more of the disclosed embodiments, alone or on combination, may provide one or more technical effects for the manufacture of battery modules, including coupling a connector barrel to a wall of a housing. In general, embodiments of the present disclosure are directed to a battery module having a housing and a connector barrel at least partially disposed within the housing, where the connector barrel facilitates coupling of internal and external signal connectors or devices. In certain embodiments, the connector barrel may be a hollow conduit having a body and two open ends disposed on opposite ends of the body. Specifically, a low voltage signal connector and a vehicle control module connector are communicatively coupled within the connector barrel. For example, the low voltage signal connector is received through the first open end of the connector barrel to mate and connect with the vehicle control module connector received through the second open end of the connector barrel. In this manner, the connectors transmit information from a control module to a vehicle control module within the battery module. The connector barrel may be fixed within an opening of a wall defining an interior of the housing. For example, the connector barrel may include a flange configured to abut the wall. Vibrations and/or heat may be applied to the flange and/or the wall, such that at least a portion of the flange and/or the wall increases in temperature and melts to create a molten mixture of the flange and/or the wall. When the molten mixture re-solidifies, the flange and the wall are coupled to one another. Heat may be applied by a variety of methods, such as via ultrasonic vibrations, a heated fluid, laser transmission, another suitable method, or any combination thereof. The presently disclosed connector barrel may simplify the manufacturing/assembly process of the battery module, may improve a seal of the housing, and may reduce a part count of the battery module. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
   an outer housing configured to receive a plurality of electrochemical cells, wherein the outer housing comprises a wall including an inner surface facing a cavity formed by the outer housing, an outer surface opposite to the inner surface, and an opening extending through the wall; and
   a connector barrel configured to be disposed in the opening of the wall, wherein the connector barrel comprises a first open end, a second open end, and a body forming a hollow interior between the first open end and the second open end, wherein the connector barrel comprises a flange disposed on the body and extending outwardly from the body, and wherein the flange comprises a plurality of ridges configured to abut the wall.

2. The battery module of claim 1, wherein the plurality of ridges are configured to abut the outer surface of the wall or the inner surface of the wall.

3. The battery module of claim 1, comprising a low voltage signal connector extending through the first open end and a vehicle control module connector extending through the second open end, and wherein the connector barrel is configured to facilitate mating between the low voltage signal connector and the vehicle control module connector.

4. The battery module of claim 1, wherein the opening in the wall is configured to receive the connector barrel such that the first open end is disposed within the cavity of the outer housing, such that the second open end is disposed external to the outer housing, and such that the flange of the connector barrel is disposed external to the outer housing.

5. The battery module of claim 1, wherein ridges of the plurality of ridges extend along the flange radially outwardly from the body of the connector barrel.

6. The battery module of claim 1, wherein ridges of the plurality of ridges extend along the flange in an elliptical or circumferential shape.

7. The battery module of claim 1, wherein ridges of the plurality of ridges extend along the flange in horizontal rows, vertical columns, or both.

8. The battery module of claim 1, wherein the plurality of ridges is disposed on a first surface of the flange, and wherein the plurality of ridges is configured to receive and concentrate ultrasonic vibrations applied to the connector barrel along a second surface of the flange.

9. A method of manufacturing a battery module, comprising:
   positioning a body of a connector barrel through an opening in a wall of a housing of the battery module such that a first end of the connector barrel is disposed within an interior of the housing, such that a second end of the connector barrel is disposed outside the interior of the housing, and such that a first surface of a flange of the connector barrel, which extends outwardly from the body of the connector barrel, abuts the wall;
   applying heat to cause local melting along an interface between the first surface of the flange and the wall; and
   cooling the interface such that the interface comprises a weld between the wall and the flange.

10. The method of claim 9, wherein applying heat comprises applying ultrasonic vibrations through a second surface of the flange of the connector barrel to a plurality of ridges along the first surface of the flange to concentrate the ultrasonic vibrations and generate friction, wherein the friction causes the local melting along the interface.

11. The method of claim 10, wherein positioning the body of the connector barrel through the opening in the wall comprises abutting the plurality of ridges against the wall of the housing.

12. The method of claim 10, comprising abutting an ultrasonic horn against the second surface of the flange, wherein applying the ultrasonic vibrations comprises transmitting the ultrasonic vibrations through the second surface via the ultrasonic horn.

13. The method of claim 10, comprising positioning the connector barrel and the wall on an anvil and positioning the body of the connector barrel through the opening of the wall, wherein the anvil is configured to support the connector barrel and the wall as ultrasonic vibrations are applied through the second surface of the flange of the connector barrel.

14. The method of claim 9, wherein applying heat comprises transmitting infrared radiation through the wall onto the first surface of the flange via a laser, wherein the first surface is configured to absorb the laser and convert infrared radiation of the laser into heat to cause the local melting along the interface.

15. The method of claim 9, wherein applying heat comprises transmitting infrared radiation through the flange onto the wall via a laser, wherein the wall is configured to absorb the laser and convert infrared radiation of the laser into heat to cause the local melting along the interface.

16. The method of claim 15, wherein transmitting infrared radiation comprises transmitting infrared radiation onto a ridge of the wall, wherein the ridge is configured to absorb the laser and convert infrared radiation of the laser into heat to cause the local melting along the interface.

17. A connector barrel of a battery module, comprising:
   a body including a first open end, a second open end, and a hollow interior formed by the body that extends between the first open end and the second open end; and
   a flange disposed on the body and extending outwardly from the body, wherein the flange comprises a plurality of energy concentrator ridges disposed on a surface of the flange, and wherein the plurality of energy concentrator ridges are configured to facilitate ultrasonic welding of the flange to a wall of the battery module.

18. The connector barrel of claim 15, wherein the flange comprises an additional surface opposite to the surface, and wherein the additional surface is smooth and configured to receive an ultrasonic welding horn thereon such that the ultrasonic welding horn can apply ultrasonic vibrations through the additional surface and to the plurality of energy concentrator ridges.

19. The connector barrel of claim 15, wherein the flange comprises a rectangular shape extending outwardly from the body.

20. The connector barrel of claim 15, wherein the flange is formed separately from the body, and wherein the flange is coupled to the body.

21. The connector barrel of claim 15, wherein the body comprises an elliptical shape extending about the hollow interior.

22. The connector barrel of claim 15, wherein each energy concentrator ridge of the plurality of energy concentrator ridges comprises a triangular shape along a length of the connector barrel and extends away from the surface of the flange.

* * * * *